May 8, 1928.
H. L. JOHNSTON
CLUTCH MECHANISM
Filed July 2, 1923
1,669,006
3 Sheets-Sheet 1
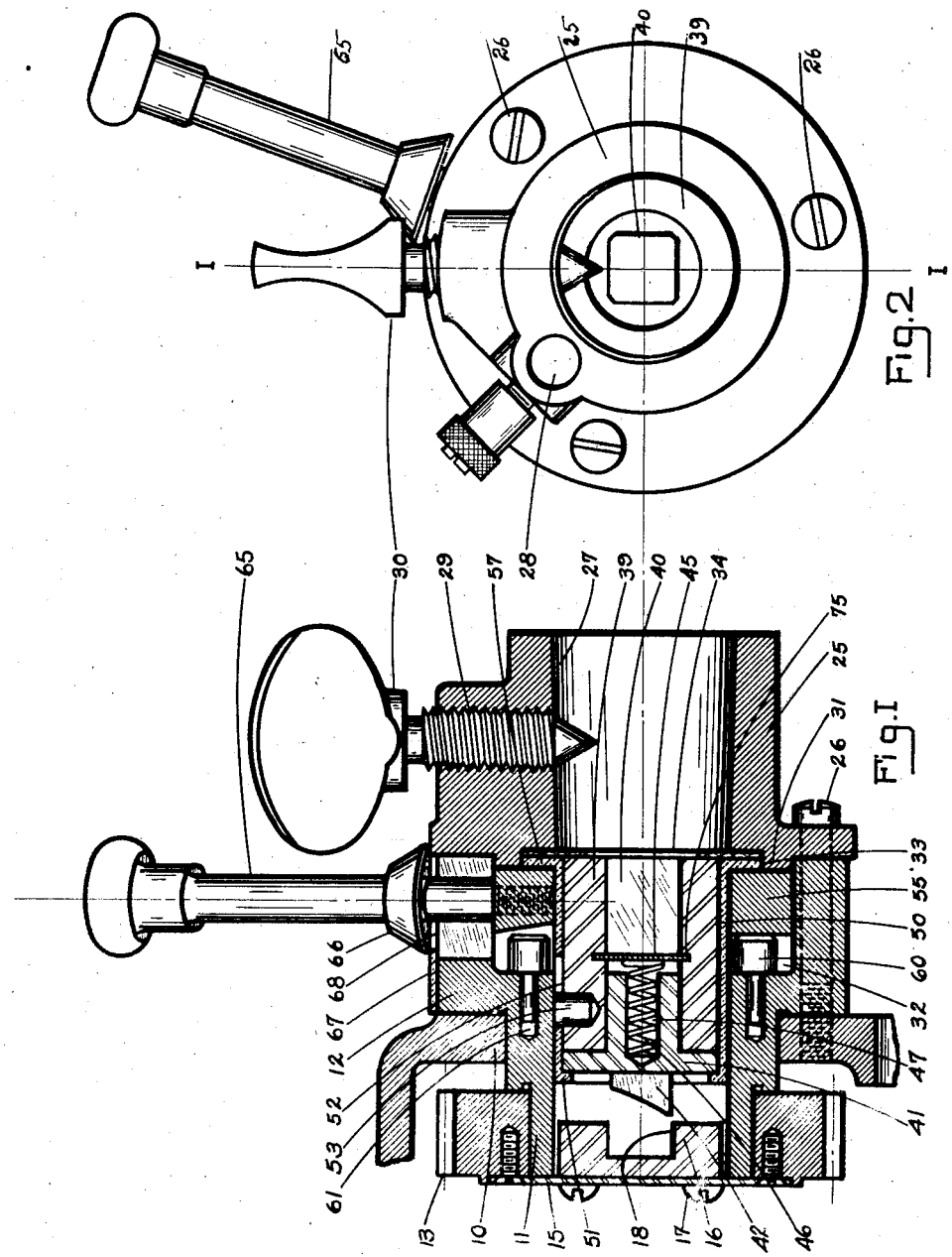
INVENTOR.
Herbert L. Johnston
BY
ATTORNEYS.

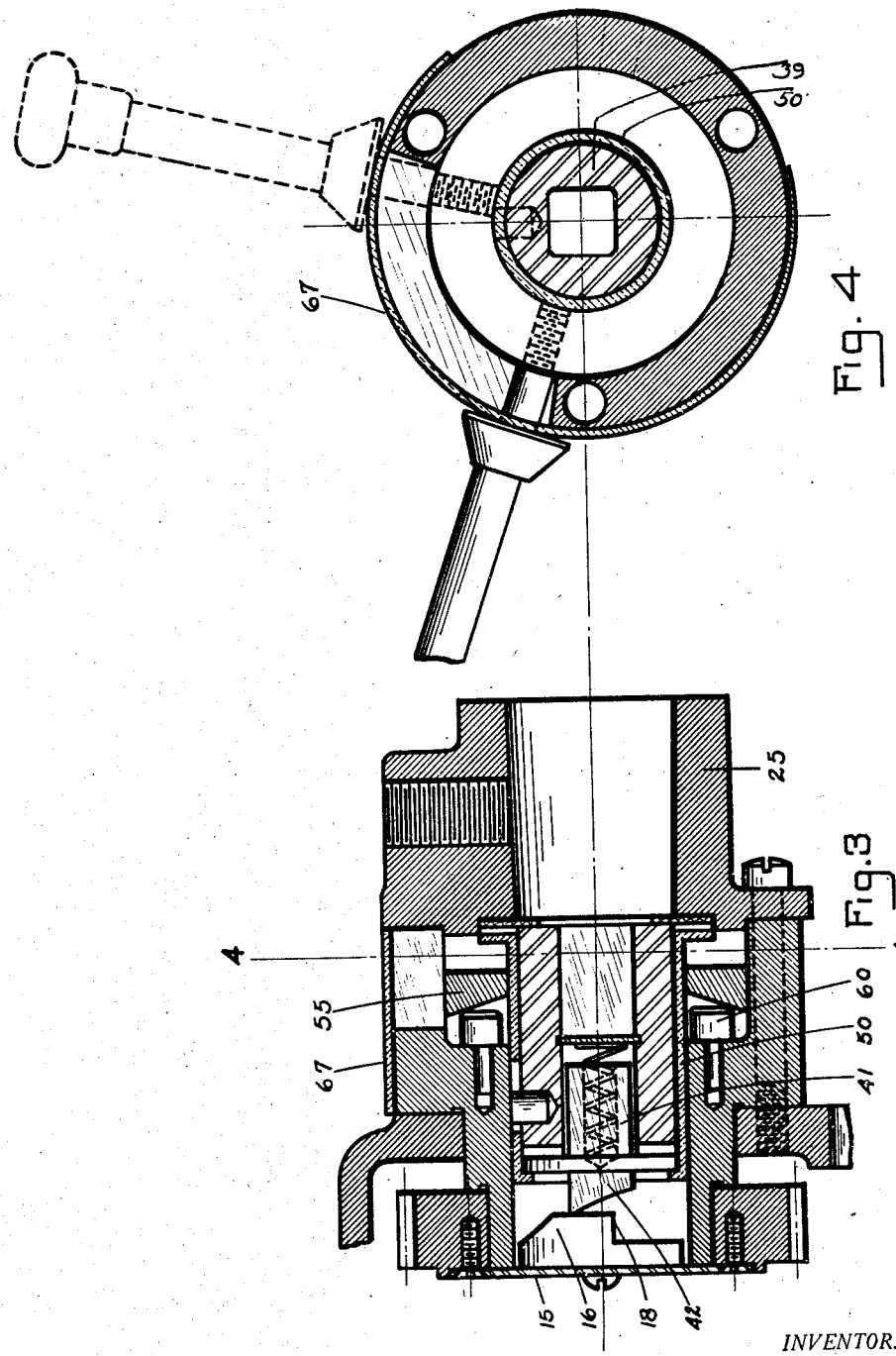

May 8, 1928.
H. L. JOHNSTON
1,669,006
CLUTCH MECHANISM
Filed July 2, 1923
3 Sheets-Sheet 3
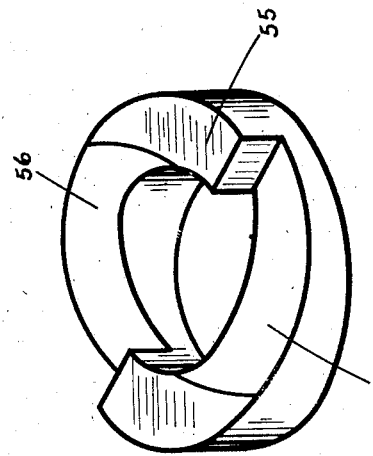
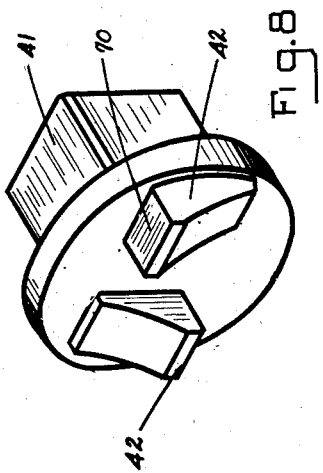
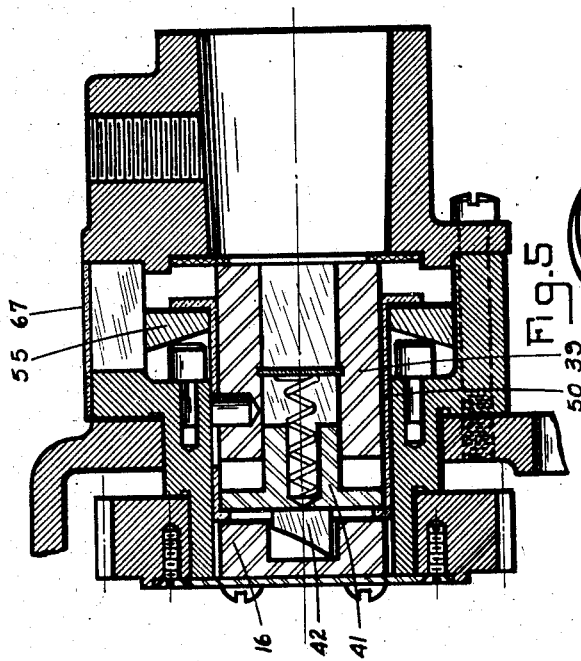
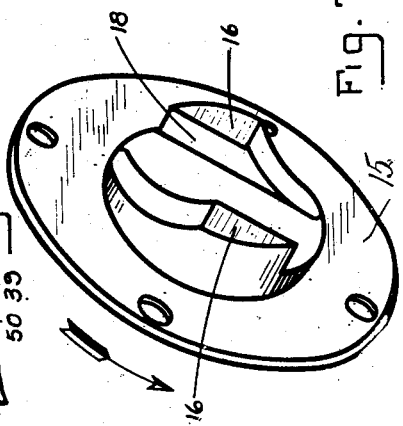
INVENTOR.
Herbert L. Johnston
BY
ATTORNEYS.

Patented May 8, 1928.

1,669,006

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

CLUTCH MECHANISM.

Application filed July 2, 1923. Serial No. 649,011.

This invention relates to an improved type of clutch mechanism.

One of the principal objects of the invention is to provide a clutch which is so constructed that the members thereof may be moved into position for full engagement regardless of the relative positioning of these members and regardless of whether these members are moving or stationary.

Another object of the invention is to provide a clutch which is effective and dependable in operation, simple and sturdy in construction and in which ready and full engagement of the clutch members will always be secured, thus insuring long life.

Other objects and advantages of the invention will be apparent from the description set out below when taken in connection with the accompanying drawing.

In the drawing in which like characters of reference designate like parts throughout the several views thereof, Fig. 1 is a vertical sectional view of a clutch constructed in accordance with this invention, with the driven member of the clutch in retracted position, the view being substantially along the line 1—1 of Fig. 2;

Fig. 2 is an end elevation of this clutch, viewed from the right of Fig. 1;

Fig. 3 is a vertical sectional view, similar to Fig. 1, with the driven member positioned for movement into engagement with the driving member, but with the teeth held out of engagement, because of the relative angular positioning of the two clutch members;

Fig. 4 is a cross sectional view, along the line 4—4 of Fig. 3;

Fig. 5 is a vertical sectional view similar to Figs 1 and 3, with the driven member in full engagement with the driving member;

Fig. 6 is a view, in the nature of a perspective view, of a cam ring which constitutes one element of the mechanism;

Fig. 7 is a view, in the nature of a perspective, of the tooth or dog carrying member which constitutes a part of the driving member of the clutch, and Fig. 8 is a similar view of the tooth or dog carrying member which constitutes a part of the driven clutch member.

This clutch was particularly designed for use in connection with an apparatus in which a coffee grinder and a meat grinder are both driven by the same motor; but it is of course capable of general use in any other relationship. In the relationship referred to it is desirable to have the apparatus so arranged that the coffee grinder and meat grinder need not both be operated at the same time. Where an ordinary type clutch is used in connection with such apparatus difficulties in operation are encountered. For example, if the two clutch members come to rest in any other than the proper angular relationship for meshing, or engagement, of the teeth or dogs thereon, then the two clutch members may not be caused to engage without manipulation. And if an attempt is made to cause engagement of the clutch members at a time when the motor is operating, as will quite generally happen when it is necessary to use the meat grinder, for instance, when the coffee grinder is already being operated, then difficulty is encountered in securing proper engagement of the teeth of the clutch members. And where such engagement is accomplished full engagement of the teeth is seldom secured, and furthermore chipping or marring of the teeth occurs.

The clutch which forms the subject matter of this invention is adapted, particularly, to obviate these two stated objections, and is generally a very efficient, compact, rugged type of mechanism.

As shown in the drawing the clutch mechanism is mounted in a suitable opening in the wall 10, which constitutes the end wall of the gear casing, within which are housed the driving gears through which motion is transmitted from the motor, or other power source, to the driving member of the clutch. Mounted within this wall 10 is a hollow cylindrical sleeve 11 which has a cylindrical enlargement 12 thereon, the inner end of the sleeve 11 extending into the gear case and having rotatably mounted thereon the gear 13, which gear in turn meshes with a driving pinion, carried on the shaft of the operating motor or driven in any other suitable manner. Bolted to the face of the gear 13, in any suitable manner, is a plate 15, which carries teeth or dogs 16 spaced apart to form in effect a diametrically disposed groove therebetween. The construction is such that these teeth or dogs extend into the passageway through the hollow cylindrical sleeve 11, the extension being preferably circular in cross section to correspond with the contour of said passageway, and permit unimpeded rotation of the extension and dogs, within the said passageway. The projection carrying these teeth 16 may be made integral with the plate 15 but preferably it is made separate and is held firmly connected thereto by means of suitable bolts 17. As clearly shown in Fig. 7 the end face of each of the teeth 16 is given a concave curvature, over substantially half of its extent, the plane of said curved face being inclined, generally, at an angle to the longitudinal axis of the projection or of the driving clutch member, the face or shoulder 18 of each tooth 16 constituting the operating face thereof.

Attached to the enlargement 12, of the cylindrical sleeve 11 is a closure and socket member 25, which is held rigidly connected to the enlargement 12 by means of bolts 26. This member 25 is provided with a tapered socket 27, adapted to receive an extension or shank on the body of the meat grinder, or other apparatus to be operatively associated with the clutch. This socket member is provided with a smaller socket 28, adapted to receive a pin or projection on the mechanism associated therewith to hold that mechanism against rotation during operation. The socket member 25 is provided with a threaded passage 29 within which is positioned a thumb screw 30 the lower end of which is pointed, the point of this screw being adapted to extend into a correspondingly tapered socket in the extension of the meat grinder, so that when the screw is tightened it will tend to pull the tapered extension of the meat grinder tightly in place within the tapered socket 27, and will also tend to prevent rotation of the meat grinder during operation of the device.

The end of the member 25 which contacts with the cooperating end of the enlargement 12 is provided with a circular extension 31, which extends into the enlarged passageway 32 which is an enlarged continuation of the passageway within the cylindrical sleeve 11. This extension 31 is cut away to provide a recess 33. Positioned within this recess is a washer 34, preferably of vulcanized fiber, or the like, against which rests a cylindrical hollow driven member 39, the passage 40 extending therethrough being preferably square in cross section, to receive at one end the squared end of the shaft of the meat grinder or other apparatus to be operated, and at the other end to receive the squared shank of the tooth bearing member 41, which has suitable clutch teeth 42, extending therefrom and spaced apart by a transverse groove, these clutch teeth being adapted for cooperation with the clutch teeth 16 and forming in effect a diametrically disposed ridge across the face of the member 41 adapted to lie within the diametrically disposed groove in the member 15 when the clutch members are in engaged position.

Suitably mounted within the passageway 40 is a plate 45, against which rests one end of the spring 46, the other end pressing against the tooth bearing member 41. The member 41 has a socket 47 therein within which the spring 46 lies, and the arrangement is such that at all times, when the device is assembled, the spring 46 is under compression tending to move the driven member 39 and the tooth bearing member 41 apart, and as the driven member 39 is constrained against movement, under the action of the spring, because of its contact with the washer 34, the action of the spring is to at all times urge the tooth bearing member 41 toward a position in which the teeth on that member will engage with the teeth 16.

Slidably mounted upon the member 39 is a cylindrical sleeve 50, one end of which is provided with an inturned flange 51, adapted to cooperate with the tooth bearing member 41. This sleeve is provided with a slot 52, through which extends a pin 53, mounted in the driven member 39, so that while longitudinal movement of the sleeve relative to the member 39 is permitted, rotatable movement of these two parts relative to each other is prevented. Slidably mounted upon the outside of the sleeve 50 is a cam ring 55, which, as shown most clearly in Fig. 6, is provided with two cam surfaces 56, on one face of the ring, the other face of the ring being plane and adapted for contact with the outturned flange 57, upon the sleeve 50. The sleeve 11 is provided with two lugs or extensions which cooperate with the cam surfaces 56 of the ring 55, so that upon rotation of this ring in one direction it will be positively moved longitudinally of the sleeve 50, will contact with the flange 57 and will positively move the sleeve 50, against the tension of the spring 46, along the driven member 39, while upon rotation in the opposite direction reverse movement of the sleeve 50, under the action of the spring 46, will occur. These lugs or extensions may be made in any desired way, but preferably they are in the form of pins 60, which are removably mounted within the passage 61, in the sleeve 11. This construction permits ready removal of the pins in case of needed replacement due to wear.

The cam ring is provided with an operating handle 65, the inner end of which is threadedly mounted within the cam ring, while the outer end is shaped to provide a practical, and at the same time attractive looking, handle. Midway of its length this handle is provided with an enlargement 66, which contacts with the cover 67, placed over the slot 68 which permits movement of the handle to effect that rotation of the cam ring which is needed for operation. This enlargement covers the seat in the cover 67 within which the handle 65 moves during rotation of the cam ring.

As shown particularly in Fig. 8, the end faces of the teeth 42 are curved somewhat as are the end faces of the teeth 16, being defined by concave planes, these curved surfaces being also arranged generally in a plane inclined to the longitudinal axis of the member 41. The face or shoulder 70, of each of the teeth 42, constitutes the driving face thereof, each of the faces 70, during operation of the clutch contacting with one of the faces 18.

As is evident from the drawing the turned over flange 51 and the member 41 will continuously contact, since the arrangement is such that the spring 46 is always under compression. When the cam ring 55 is rotated to cause bodily translation of that ring, it will contact with the flange 57, and under continued rotation, will move that flange, and the sleeve upon which it is mounted, to the right, carrying the member 41 with it, and at the end of such rotated motion the flange 57 will contact with the washer 34, with the teeth 42 held completely out of engaging position. As soon as the cam is rotated in the opposite direction, however, the compression of the spring will cause the member 41 to move to the left, toward engaging position, carrying the sleeve 50, and cam ring 55, therewith.

If the driving member of the clutch is not in operation at that time, but is stationary, and the members of the clutch happen to be in such angular position that the teeth 42 and 16 are in an engaging position, then under the action of the spring these two sets of teeth will be caused to fully engage, as shown in Fig. 5. The same operation would take place with any clutch, where the two clutch members are both stationary and both relatively positioned for full engagement of the teeth. But if they do not happen to be in engaged position, with the ordinary type of clutch, it is impossible to make them mesh or to move them into such position that they will properly engage when operation of the clutch is begun. With the device shown herein where positive meshing of the clutch members is not secured, that is, they are not positively forced into mesh and so if they happen to be out of engaging position, as is shown in Fig. 3, the cam ring may still be rotated completely to the right, where it may assume the position shown in full lines in Fig. 4, in which case it offers no resistance to the free movement of the sleeve 50 and member 41 under the action of the spring. But, as shown in Fig. 3, under this relative positioning of the members the member 41 cannot advance to engaging position, while the clutch members are stationary. As soon as the driving member begins to rotate, however, the teeth 16 will move with reference to the teeth 42, the rotation being in the direction of the arrow in Fig. 7. As the teeth rotate the curved end faces of the two cooperating sets of teeth will permit gradual advancement of the member 41, under the action of the spring, so that after substantially 90 degrees angular rotation of the driving member the teeth 42 will have been advanced to full engaging depth and the faces 70 will then contact with the faces 18.

And of course this construction is very beneficial when an attempt is made to cause engagement of the clutch members while the driving member is rotating. Under such circumstances, clashing of the teeth will not occur, and full depth engagement will be secured, regardless of the relative positioning of the two clutch members at the time an engagement is effected. Because of the cooperating curved end faces sufficient time will be allowed for advancement of the teeth 42, to full engaging depth, regardless of the relative positioning at the time the cam ring is rotated to permit the engaging movement.

Any suitable abutment, other than the disc 45, may be used, but the construction shown is very satisfactory, both with regard to ease and simplicity of manufacture, and effectiveness. The disc 45 is preferably of copper, or the like, and before it is inserted in place it is first cupped or given a cone shape, after which it is inserted into the passageway within the member 39, after which it is flattened out, so that the edges extend into the groove 75.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:—

1. A high speed clutch, of the character described, comprising a driving member and a driven member, cooperating teeth on said members; means for positively moving one of said members away from the other; and yieldable means associated with one of said members tending to urge the teeth thereof at all times toward engaged position, the teeth on the said members being so arranged that during actual advancing movement of the said teeth from their full unengaged but contacting position to full engaged position, the clutch members turn not less than a quarter turn relative to one another.

2. In a high speed clutch of the character described, a support, a driving member rotatably mounted on said support and having teeth thereon; a driven member rotatably mounted on said support, a tooth carrying member slidably mounted on said driven member, a spring interposed between said driven member and the tooth carrying member, and tending to normally slide the said two members in opposite directions, the said spring being at all times under compression; and means for positively moving the tooth carrying member away from the driving member, the construction being such as to insure full depth engagement at all times.

3. A clutch of the character described comprising a driving member, having teeth thereon; a hollow driven member; a longitudinally movable sleeve mounted on said driven member, a circular flange on said sleeve, a cam ring slidably mounted on said sleeve, a cam surface cooperating with said cam ring, the construction being such that when the cam ring is rotated to coact with the said cam surface bodily movement of the ring will be effected to bring that ring into contact with the said circular flange and cause corresponding movement of the said sleeve; a tooth carrying member slidably mounted within said hollow driven member, an inturned flange carried by said movable sleeve and cooperating with the said tooth carrying member; and a spring interposed between the said hollow driven member and the tooth carrying member to urge the said tooth carrying member at all times against the said inturned flange; and an operating handle on said cam ring whereby rotation thereof to effect movement of the said movable sleeve and tooth carrying member against the resistance of the said spring may be effected.

4. A clutch of the character described comprising a driving member having teeth thereon; a driven member having teeth thereon; means for positively moving said members away from each other; and spring means for moving said members toward each other and into driving engagement; the opposing end faces of the said teeth being curved and generally inclined, the construction being such that forward movement of the teeth, on the driven member, under the action of the said spring means, will take place during a substantial period of rotation of the said driving mechanism, to permit full advancement of the said teeth on the driven member to insure full engagement of the cooperating teeth on the two clutch members.

5. A clutch mechanism of the character described comprising driving and driven clutch members in alignment with one another and supported for movement into or out of driving connection with each other, one of said clutch members having a diametrically disposed slot formed in the end thereof to provide offset upright driving shoulders on the said clutch member, the wall of the slot facing each driving shoulder being cut away along a line sloping from the top level of the driving shoulder to the bottom of the slot.

6. A clutch mechanism of the character described comprising driving and driven clutch members in alignment with one another and supported for rotation about a common axis, one of said clutch members having a diametrically disposed slot formed in the end thereof to provide offset upright driving shoulders on the clutch member, the wall of the slot facing each driving shoulder being cut away along a line sloping from the top level of the driving shoulder to the bottom of the slot, and the other of said clutch members being provided with a pair of clutch teeth having upright driving faces adapted to engage the driving faces of the clutch teeth on the first clutch member and in a direction transverse to the slot formed therein.

7. A clutch of the character described comprising a driving member, a tooth on said member having a driving face arranged substantially parallel to a plane passing through the axis of rotation of said driving member, and to one side of said axially arranged plane, said tooth extending substantially across the said driving member, and being cut away throughout substantially half its extent, to provide a curved, generally inclined end face for said cut away portion; a driven member, having a tooth thereon provided with a flat driving face, arranged in a plane substantially parallel to a plane passing through the axis of rotation of the said driven member, and arranged to one side of said axially arranged plane, said tooth being cut away through a substantial portion of its extent, to provide a curved end face, the said tooth being so arranged that when the flat end face thereof cooperates with the flat face of the tooth on the driving member, the cooperating teeth will be arranged at substantially right angles to each other, and means, including a spring, for moving the driving and driven members relative to each other to effect engagement of the two said teeth, the construction being such that full depth engagement of the said teeth will be insured, irrespective of the relative positioning of the two clutch members at the time the engaging movement takes place.

8. A clutch mechanism comprising clutch members disposed for end-to-end engagement with one another, said members having on their cooperating end faces a diametrically disposed groove and a diametrically disposed ridge respectively, said groove and said ridge each presenting pairs of opposed shoulders the opposite end portions of said pairs of opposed shoulders constituting upright driving faces, and the ends of said shoulders opposed to said driving faces being cut away to facilitate full depth engagement of the driving faces of said clutch members.

9. A clutch mechanism comprising clutch members disposed for end-to-end engagement with one another, said members having on their cooperating end faces a diametrically disposed groove and a diametrically disposed ridge respectively, said groove and said ridge each presenting pairs of opposed shoulders the opposite end portions of said pairs of opposed shoulders constituting upright driving faces, the ends of said shoulders opposed to said driving faces being cut away to facilitate full depth engagement of the driving faces of said clutch members, and said ridge being further cut away to provide a groove transverse to its length to separate the driving faces thereof from the cut away portions of said shoulders.

10. A clutch of the character described comprising a stationary supporting sleeve having a longitudinal bore therethrough, first and second clutch members within said bore and having clutch teeth thereon adapted to be moved into engagement with one another, a rotary gear member surrounding and mounted upon said supporting sleeve and operatively connected with said first clutch member, said gear overlying the zone of engagement of said clutch members, and means carried by the support for controlling the engagement of said clutch members.

11. A clutch of the character described comprising a driving member, a driven member, said driving member and said driven member having cooperating contacting surfaces and cooperating driving surfaces, said contacting surfaces being inclined with respect to the direction of engaging movement of the said members relative to each other, and control means for effecting engagement of said members comprising yieldable means for moving said members toward each other and into driving engagement, said cooperating contacting surfaces and driving surfaces being so constructed as to permit progressive relative advancement of said members toward each other during an initial period of relative rotation after said control means is moved to engagement effecting position to effect substantially full depth engagement of said members.

12. A clutch of the character described comprising a driving member, having teeth thereon; a driven member having teeth thereon; means for positively moving said members away from each other; and spring means for moving said members toward each other and into driving engagement, the opposing end faces of the said teeth being curved to permit relative movement of said members toward each other during the initial period of relative rotation after the positively operated means is moved to clutch engaging position to permit substantially full depth engagement of the teeth.

In testimony whereof I hereto affix my signature.

HERBERT L. JOHNSTON.